(12) United States Patent
Rucker et al.

(10) Patent No.: US 8,196,029 B1
(45) Date of Patent: Jun. 5, 2012

(54) SYSTEM AND METHOD FOR ENABLING SIMULTANEOUS MULTI-USER ELECTRONIC DOCUMENT EDITING

(75) Inventors: Erik Rucker, Seattle, WA (US); Ethan Joseph Bernsten, Seattle, WA (US); Alan Ramaley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 3005 days.

(21) Appl. No.: 09/598,856

(22) Filed: Jun. 21, 2000

(51) Int. Cl.
*G06F 17/22* (2006.01)
*G06F 17/24* (2006.01)

(52) U.S. Cl. .................................... 715/200; 715/255

(58) Field of Classification Search .................. 715/517, 715/530, 200
See application file for complete search history.

(56) References Cited

U.S. PATENT DOCUMENTS

| | | | | |
|---|---|---|---|---|
| 5,781,732 A * | 7/1998 | Adams | ........................... | 709/205 |
| 5,835,601 A * | 11/1998 | Shimbo et al. | ................. | 713/165 |
| 5,890,177 A * | 3/1999 | Moody et al. | .................. | 715/511 |
| 5,958,005 A * | 9/1999 | Thorne et al. | .................. | 709/202 |
| 6,067,551 A * | 5/2000 | Brown et al. | .................. | 707/203 |
| 6,088,702 A * | 7/2000 | Plantz et al. | .............. | 707/103 R |
| 6,411,965 B2 * | 6/2002 | Klug | ............... | 707/201 |
| 6,560,719 B1 * | 5/2003 | Pham et al. | ....................... | 714/15 |
| 2003/0001891 A1 * | 1/2003 | Keohane et al. | ............... | 345/754 |
| 2005/0055306 A1 * | 3/2005 | Miller et al. | ..................... | 705/37 |
| 2008/0148146 A1 * | 6/2008 | Estrada et al. | ................. | 715/255 |

OTHER PUBLICATIONS

Hardock, Gary, et al. "A Marking Based Interface for Collaborative Writing", Nov. 5, 1993.*
Lin, Jin-Kun, "MediaMosaic—A Multimedia Editing Environment", Nov. 18, 1992.*

* cited by examiner

*Primary Examiner* — Doug Hutton, Jr.
*Assistant Examiner* — James Debrow
(74) *Attorney, Agent, or Firm* — Merchant & Gould PC

(57) ABSTRACT

A document management system and method are provided to support simultaneous multi-user editing of a single document. The system and method do not require the use of a new file format or the use of a central document repository to limit user access to the document. When a user attempts to open the document and a determination is made that the document is in use, then an alert is presented to the user that informs the user that the document is locked for editing. The user may select to receive a notification when the original document is no longer in use. If the user selects to make a local copy and subsequently merge the changes, the local copy will be made and the path of the original document will be stored so that the original document location can be determined at the time that the changes are merged. When the original document becomes available, the user's changes can be merged into the original document. The original document is located using the original path that was stored when the local copy was created. Of course, any time that a merge is attempted, and a conflict exists (i.e., the changes in the local document are inconsistent with the changes made to the original document), an alert can be generated to inform the user of the conflict and the user can be prompted to reconcile the conflict to complete the merge.

27 Claims, 8 Drawing Sheets

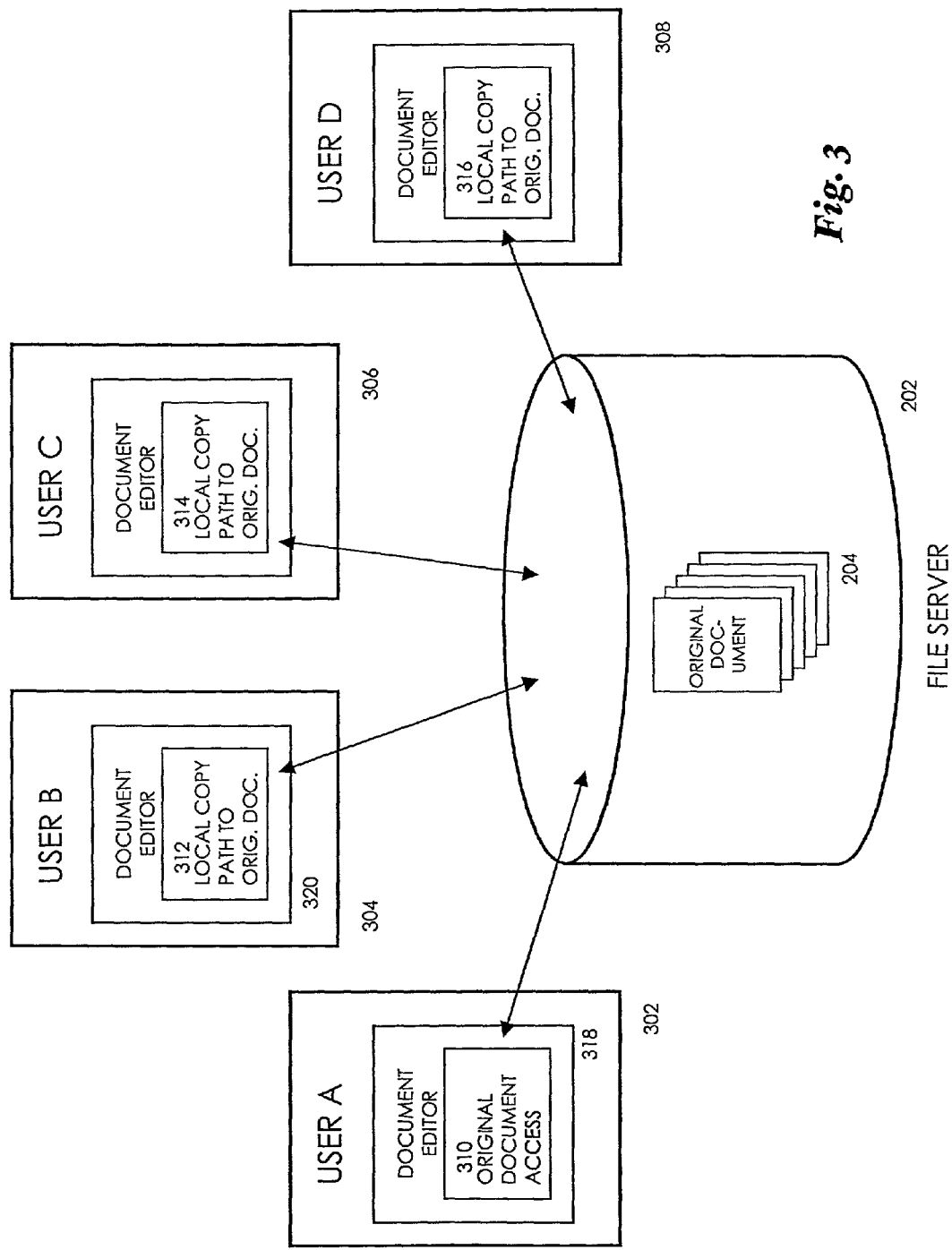

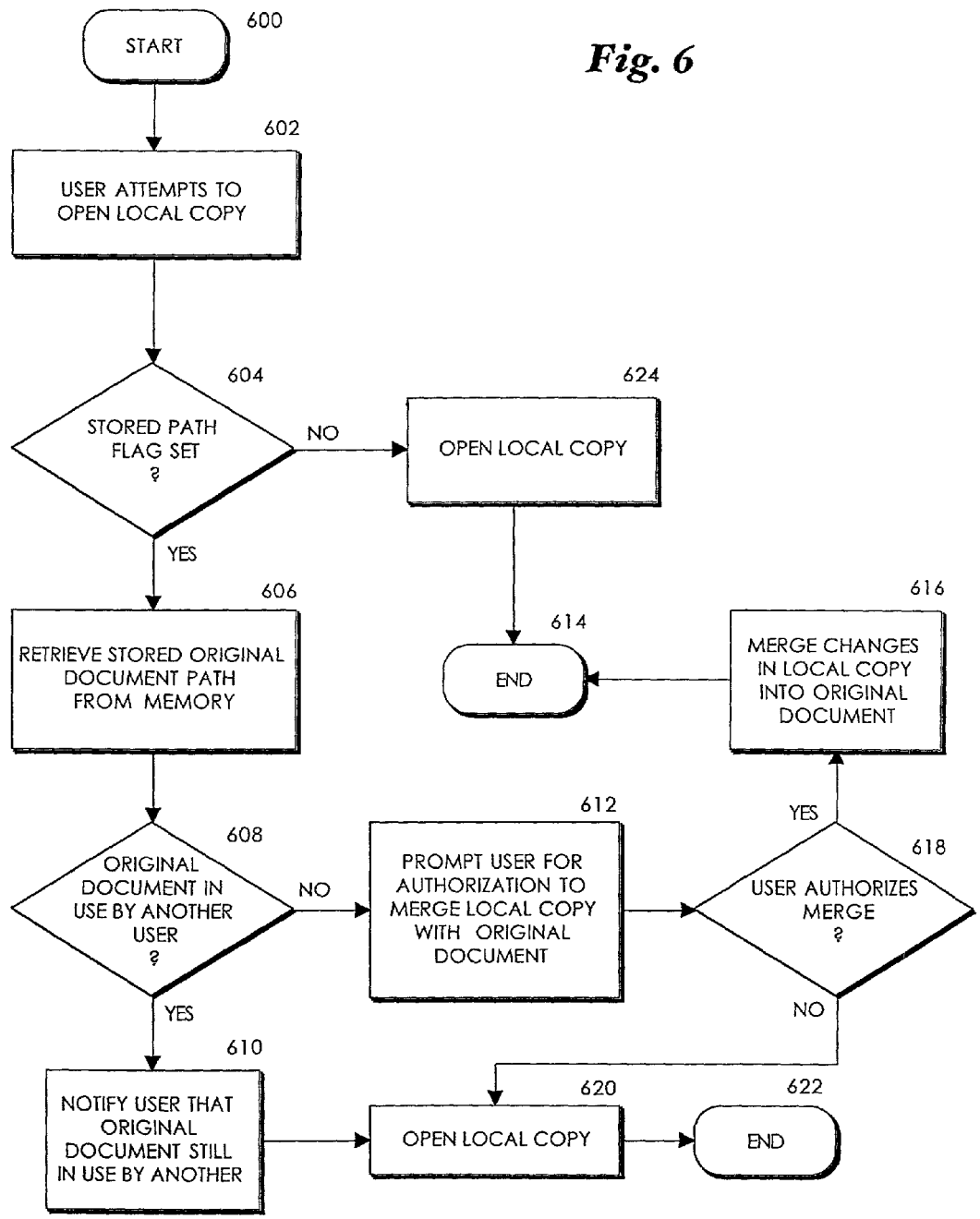

SYSTEM AND METHOD FOR ENABLING SIMULTANEOUS MULTI-USER ELECTRONIC DOCUMENT EDITING

TECHNICAL FIELD

The present invention relates to a system and method for enabling multi-user electronic document editing, and more particularly relates to a system and method for enabling simultaneous multi-user electronic document editing by managing the merging of changes of multiple users editing the same document at the same time.

BACKGROUND OF THE INVENTION

Computer users desire the ability to permit multiple users to review and edit documents at the same time. However, in order to avoid the situation in which two users make conflicting changes to the same document, safeguards have been implemented to prohibit a second user from accessing a document that is currently opened by another user. This has been accomplished in the past by locking the document when it is being edited by any user and prohibiting subsequent attempts to open the document. Unfortunately, this solution does not provide for simultaneous multi-user review and edit of a particular document. Because only one user can open and edit the document at any given time, this approach only provides for sequential multi-user editing. Simultaneous multi-user editing has been enabled through at least two other approaches.

One approach utilizes a central server process that permits users to merge local changes back into a shared copy of the document (the original document). Under this approach, when one user attempts to save changes to the document, the central server process attempts to store the user's changes to the original document. If the original document has been edited since the user opened its local copy, the user is notified of a potential conflict. Upon notification, the user can choose which version to store as the original document. Alternatively, the central server process can attempt to merge the changes in the user's local copy with the changes made in the modified original documents. Unfortunately, this approach is unacceptable to many users, because it requires the user to implement a central document repository for managing the document library. The repository may require a separate central server (or access monitor) to handle the requests for checking documents in and out of the repository. This process is consumptive of system resources and can slow user access to documents.

A second approach involves the use of a specialized file format that supports multi-user editing. For example, MICROSOFT EXCEL utilizes a special format referred to as a "shared workbook" that supports multi-user editing. Unfortunately, this approach is often unacceptable to users because a new file format may not be compatible with the user's earlier, non-multi-user file formats. Users are typically unwilling to utilize file formats that are not compatible with previously used file format. In addition, often the multiple user file format will have limited functionality as compared with non-multi-user file formats. That is, many of the special features of non-multi-user file formats will be disabled, because they tend to create more conflicts when changes are merged.

Therefore, there is a need for a means for enabling simultaneous multi-user editing that does not require a new file format and does not require a central server process.

SUMMARY OF THE INVENTION

The present invention fulfills the need in the art for a simple and elegant means for allowing multi-user editing of an original document. The system and method provided by the present invention do not require the use of a new file format or the use of a central document repository.

In one aspect of the invention, when a user of an embodiment of the present invention attempts to open an original document, a determination is made as to whether the original document is in use by another user. If the original document is not in use by another user, the document is opened and the user may edit the document in the conventional manner.

If a determination is made that the document is in use, then an alert is presented to the user that informs the user that the document is locked for editing. The alert will also provide the user with three options. The user may select to open the document as a "read only" document. The user may select to open a document as a "local copy" and subsequently merge any changes into the original document. Finally, the user may select to receive a notification when the original document is no longer in use. If the user selects the first option, a read-only version of the document will be provided and the user may save the document under a separate filename and/or in a location other than that occupied by the original document.

If the user selects to make a local copy and subsequently merge the changes, the local copy will be made and the path of the original document will be stored so that the original document location can be determined at the time that the changes are merged. If the local copy of the document is closed without any changes, the local copy is simply discarded. If, on the other hand, the user selects to save changes to the local copy of the document, a determination will be made as to whether the original document is still in use. If the original document is not in use, then the user will be notified that the original document is available.

If the original document is available, the user will be able to select whether to merge the user's changes into the original document. If the user selects to merge the user's changes into the original document, then the original document is opened and the changes are merged. The original document is located using the original path that was stored when the local copy was created. At this point, the local copy is closed (and discarded) and focus is transferred to the original document.

If, when the user selected to save changes to the local copy, a determination is made that the original document is still in use, the user will be presented with an alert that notifies the user that original document is still in use. The user will be allowed to select between saving the local copy as a separate file and canceling the save instruction. If the user selects to save the local copy then the document is saved. When the document is saved, it is saved with a property that stores the path of the original document with the saved local document. The user may subsequently choose to merge the local document with the original document. In this case, the merge procedure will find the path to the original document that was stored with the local document and a merge will be attempted to save the differences between the local document and the original document.

In another aspect of the invention, any time that a merge is attempted, and a conflict exists (e.g., the changes in the local document are inconsistent with the changes made to the original document), an alert can be generated to inform the user of the conflict and the user can be prompted to reconcile the conflict. In this aspect of the present invention, a prompt can be provided to the user when the original document is still in use and the user seeks to save the user's changes to the original document. The prompt could enable the user to send the changes in the local copy via email to a recipient. When the recipient receives the local copy via email, the recipient may then merge the local copy with the original document. The path of the original document may be saved with the local copy so that the recipient would be notified of the original document to which the changes were intended to be made.

BRIEF DESCRIPTION OF THE DRAWINGS

FIG. 3 is a block diagram depicting the primary components of an exemplary embodiment of the present invention.

FIG. 6 is a flowchart depicting a method for merging changes into an original document when a user attempts to open a local copy of that original document in an exemplary embodiment of the present invention.

DETAILED DESCRIPTION

Figure 1:
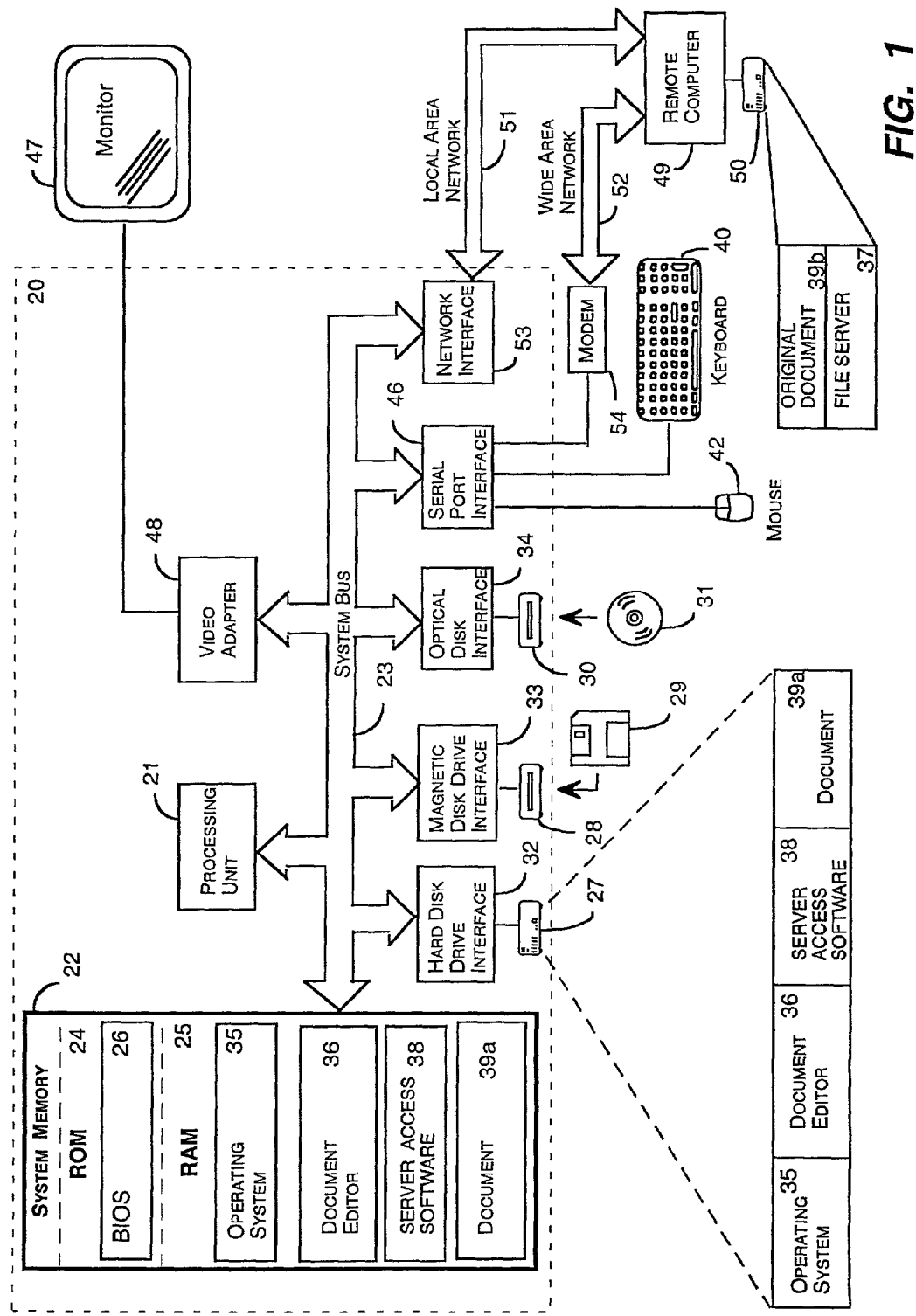
FIG. 1 is a block diagram of a computer system that provides the operating environment for an exemplary embodiment of the present invention.

When a user of an embodiment of the present invention attempts to open an original document, a determination is made as to whether the original document is in use by another user. If the original document is not in use by another user, the document is opened and the user may edit the document in the conventional manner.

If a determination is made that the document is in use, then an alert is presented to the user that informs the user that the document is locked for editing. The alert will also provide the user with three options. The user may select to open the document as a "read only" document. The user may select to open a document as a "local copy" and subsequently merge any changes into the original document. Finally, the user may select to receive a notification when the original document is no longer in use. If the user selects the first option, a read-only version of the document will be provided and the user may save the document under a separate filename and/or in a location other than that occupied by the original document.

If the user selects to make a local copy and subsequently merge the changes, the local copy will be made and the path of the original document will be stored so that the original document location can be determined at the time that the changes are merged. If the local copy of the document is closed without any changes, the local copy is simply discarded. If, on the other hand, the user selects to save changes to the local copy of the document, a determination will be made as to whether the original document is still in use. If the original document is not in use, then the user will be notified that the original document is available.

If the original document is available, the user will be able to select whether to merge the user's changes into the original document. If the user selects to merge the user's changes into the original document, then the original document is opened and the changes are merged. The original document is located using the original path that was stored when the local copy was created. At this point, the local copy is closed (and discarded) and focus is transferred to the original document.

If, when the user selected to save changes to the local copy, a determination is made that the original document is still in use, the user will be presented with an alert that notifies the user that original document is still in use. The user will be allowed to select between saving the local copy as a separate file and canceling the save instruction. If the user selects to save the local copy then the document is saved. When the document is saved, it is saved with a property that stores the path of the original document with the saved local document. The user may subsequently choose to merge the local document with the original document. In this case, the merge procedure will find the path to the original document that was stored with the local document and a merge will be attempted to save the differences between the local document and the original document.

An Exemplary Operating Environment

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more document editor application programs 36, server access program module 38 for providing access to a remote file server, and any number of documents 39a. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. In FIG. 1, the remote computer 49 is a server that is controlled by a file server program module 37 and maintains original document 39b. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

An exemplary embodiment of the present invention is represented by the "MICROSOFT WORD" word processing application program, the "MICROSOFT EXCEL" spreadsheet application program, the "MICROSOFT ACCESS" database application program, and the "MICROSOFT POWERPOINT" graphical presentation application program. However, it should be understood that the present invention can be implemented by various program modules and/or application programs for use with various operating systems.

A Conventional File Server System

Figure 2A:
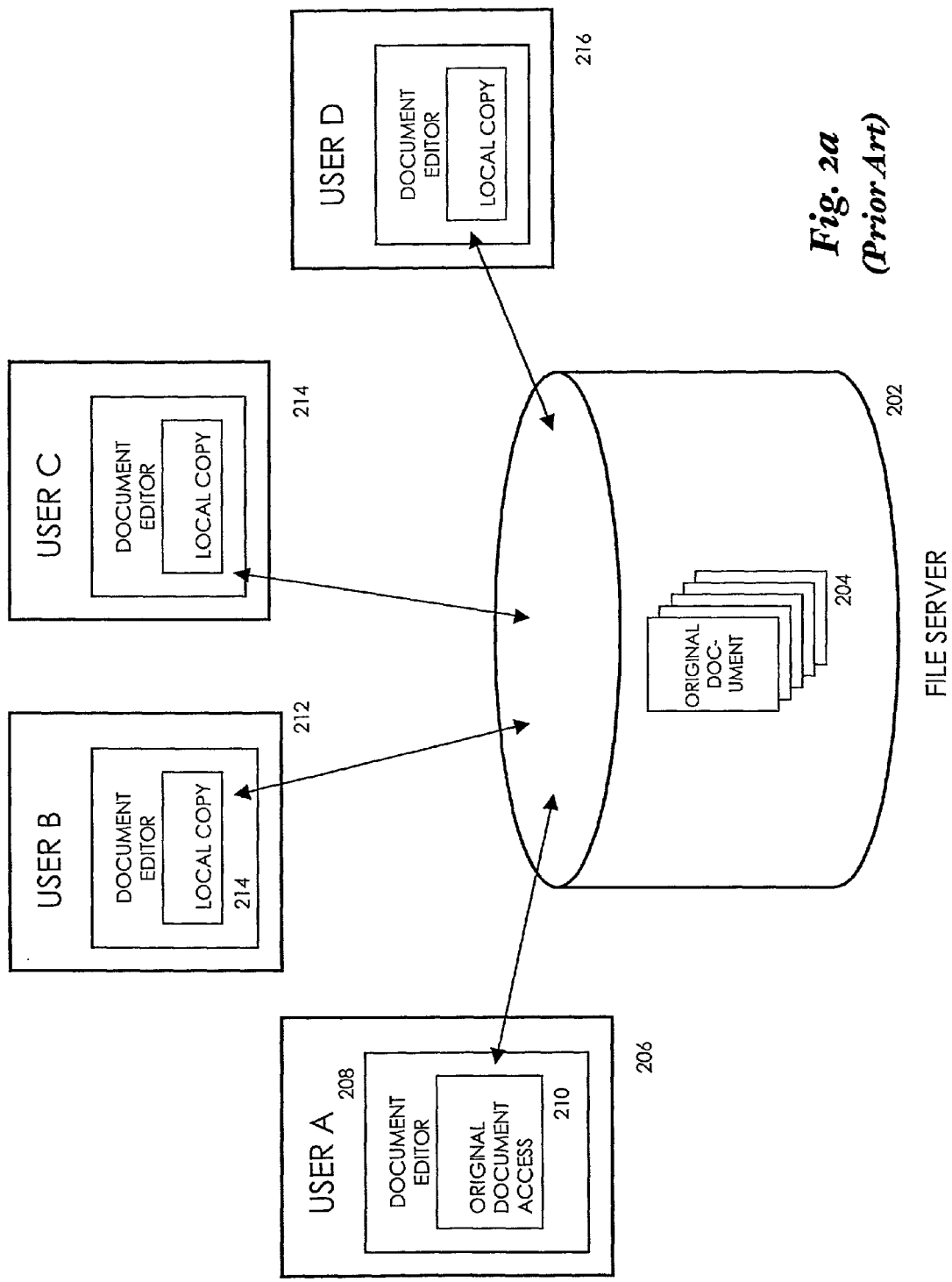
FIG. 2a is a block diagram depicting an exemplary server arrangement in which multiple users have access to a single document.

FIG. 2a depicts a conventional file server system in which USER A 206, USER B 212, USER C 214 and USER D 216 are connected to file server 202 over a network connection. All users have access to an original document 204 on the file server 202. However, access to the original document must be limited to the extent that multiple simultaneous modifications of the original document can create conflicts.

Conflicts occur when two or more users attempt to make inconsistent modifications to the same document. For example, USER A 206 may wish to replace a sentence in the original document 204, while USER B 212 wishes to delete the sentence entirely. Various known methods exist for resolving conflicts by prompting one or both users to select the effective change. However, because conflicts can occur, modifications to a document must be limited so that conflicts can be identified and users can be prompted to reconcile identified conflicts.

Access to an original document can be limited in various ways. One approach has been to use a document editor to limit access to an original document. In this approach, the first user to access the original document has unlimited access thereto. In the case of FIG. 2a, USER A 206 has obtained original document access 210 and is editing the original document with document editor 208. Document editor 208 will temporarily mark original document 204 with a flag that indicates that the document is in use. If other users were to attempt to access the original document using a compatible document editor, the flag would be recognized and the other user's document editor would limit the user's access to the original document. Typically, the user's access would be limited by either prohibiting the user to access the document at all or by forcing the user to open a local copy of the document. A local copy of the document is an entirely new document and cannot be saved to the path of the original document while that document is still open. By forcing the creation of a local copy, the original document cannot be edited by two users simultaneously. Accordingly, as is depicted in FIG. 2a, USER B, USER C and USER D have local copies of original document 204.

In the conventional system depicted in FIG. 2a, USERS B-D will be permitted to access the original document 204 when USER A closes its original document access to 210. Of course, once USER A has relinquished original document access 210, USERS B-D can replace original document 204 with their local copies, but only one at a time. The conventional system of FIG. 2a does not enable simultaneous multi user document editing. That is, any changes that USERS B-D make to there local copies will not necessarily be merged (i.e., reconciled) with the changes that USER A made to original document 204 while USER A maintained original document access 210.

Figure 2B:
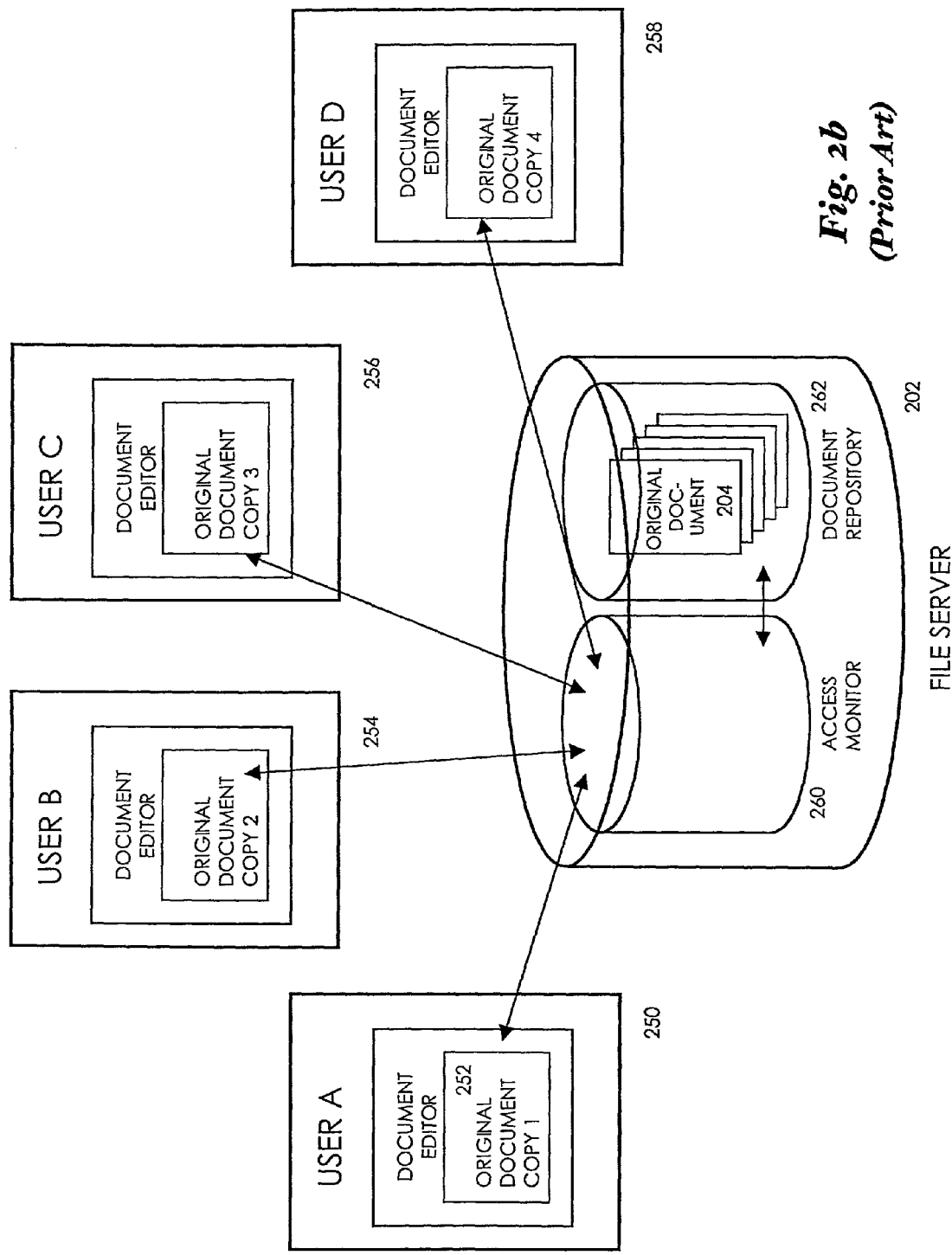
FIG. 2b is a block diagram depicting an exemplary server arrangement in which multiple users have restricted access to a single document.

Turning now to FIG. 2b, another conventional file server system is depicted in which simultaneous multi-user document editing is enabled. In the system of FIG. 2b, the file server 202 has two sub-units: access monitor 260 and document repository 262. The original document 204 and all other documents are stored within document repository 262. All access to any documents within document repository 262 is monitored and controlled by access monitor 260. Accordingly, if any one of USERS A-D attempts to open original document 204 the access monitor will allow the user to make a copy of the original document and all editing done by the user will be made to the copy. Each user attempting to access the original document 204 is provided with a unique copy and the access monitor 260 maintains a record of which copy was assigned to each user.

When a user that has been assigned a copy of the original document attempts to save the changes that the user has made to the assigned copy, the access monitor 260 determines that the changes made to the copy are intended to be merged into the original document 204. The access monitor 260 will then perform the merge and the changes that USER A made to its copy will be merged into the original document 204 and the document repository 262. If USER B, for example, attempts to save its changes to its assigned copy, the access monitor will then attempt to merge those changes into the original document 204. Should any conflicts exist between the changes of USER A and the changes of USER B, the access monitor can notify the users of this conflict and prompt the users to reconcile the conflict.

In essence, the access monitor serves as a means for checking in and checking out documents for modification. Because it maintains records of all document checkouts, and tightly controls all attempts at original document modification (i.e., merges), the system depicted in FIG. 2b enables very effective simultaneous multi-user editing of original documents. However, the system of FIG. 2b requires expensive software and is consumptive of server system resources. The system also creates inefficiencies as all users must access the access monitor prior to being permitted access to a document in document repository 262.

A third approach to enable simultaneous multi-user document editing is to utilize an entirely different file format. For example, the MICROSOFT EXCEL spreadsheet program marketed by Microsoft Corporation utilizes a "shared work book" format that that supports simultaneous multi-user editing. However, such file formats often have limited functionality and are often not compatible with earlier non-multi-user file formats.

An Exemplary System for Simultaneous Multi-User Document Editing

Turning now to FIG. 3, a system is depicted in which simultaneous multi-user document editing is simply and effectively enabled. Notably, file server 202 does not have a document repository or access monitor as described in connection with FIG. 2b. In this system, the user that first attempts to access the original document 204 is provided with unlimited original document access 310. In the example of FIG. 3, USER A accessed original document 204 before USERS B-D and, accordingly, was provided original document access 310. USER A's document editor 318 can mark original document 204 with a flag that indicates to subsequent users that another user (USER A) is accessing original document 204.

Because USER A has original document access 310, USER B will be notified that the original document 204 is in use by USER A, when USER B attempts to open the original document 204. In this case, USER B will be permitted to open a local copy 312. USER B's document editor 323 can maintain the path of original document 204. Accordingly, any subsequent merge of the changes to local copy 312 can be performed on the original document 204, because the location of the original document is maintained by document editor 320 in connection with local copy 312. When USER B is finished making changes to local copy 312, USER B can elect to save the changes to the local copy or to the original document 204. If the original document is still in use by USER A (or any other user), USER B may be prompted to choose whether to save the changes locally or to attempt a merge at a later time. This aspect of the present invention is described in more detail in connection with FIGS. 4a and 4b.

An Exemplary Method for Enabling Simultaneous Multi-User Document Editing

Figure 4A:
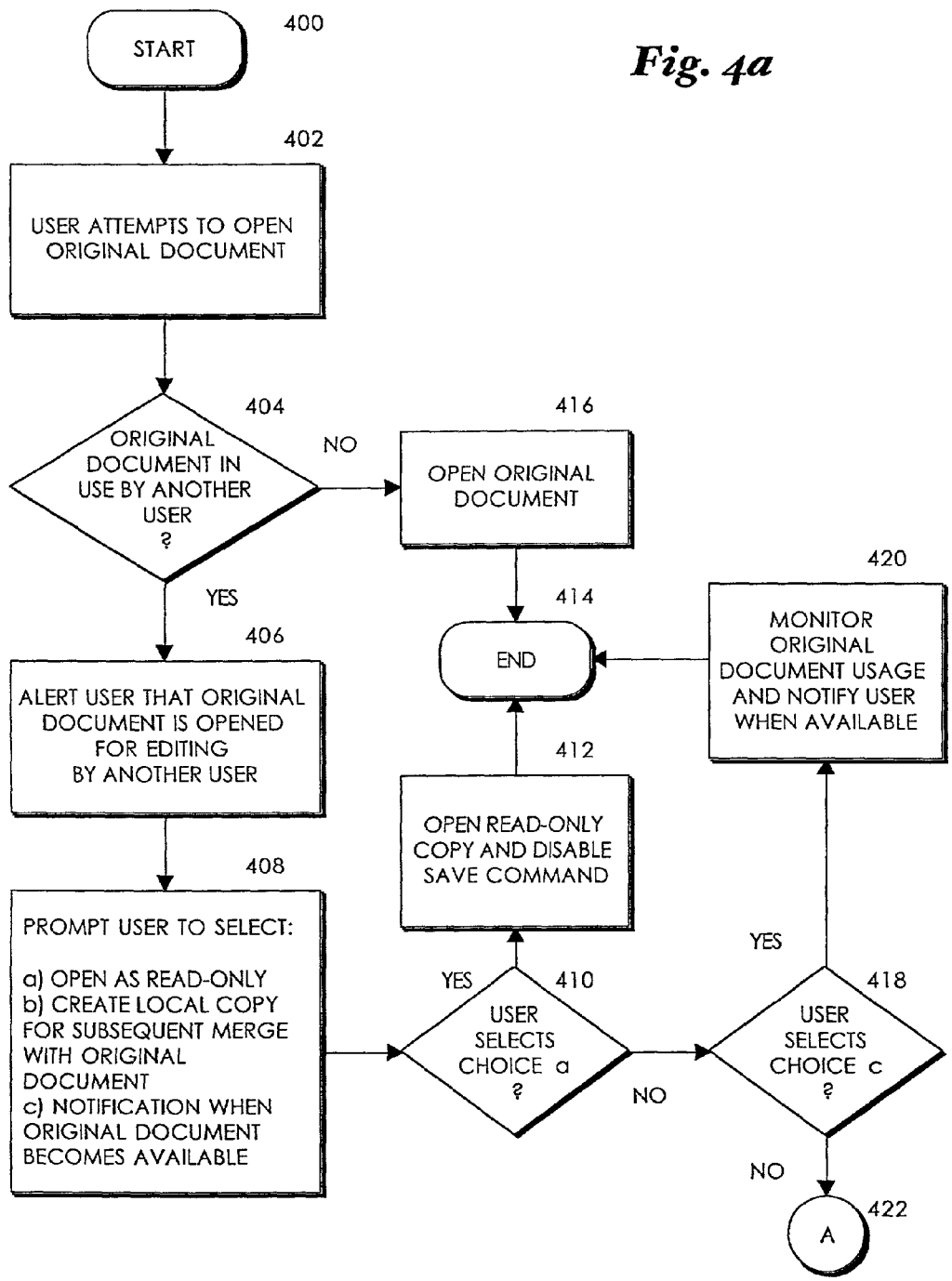
FIGS. 4a and 4b are parts of a single flowchart depicting a method for enabling simultaneous multi-user editing in an exemplary embodiment of the present invention.
Figure 4B:
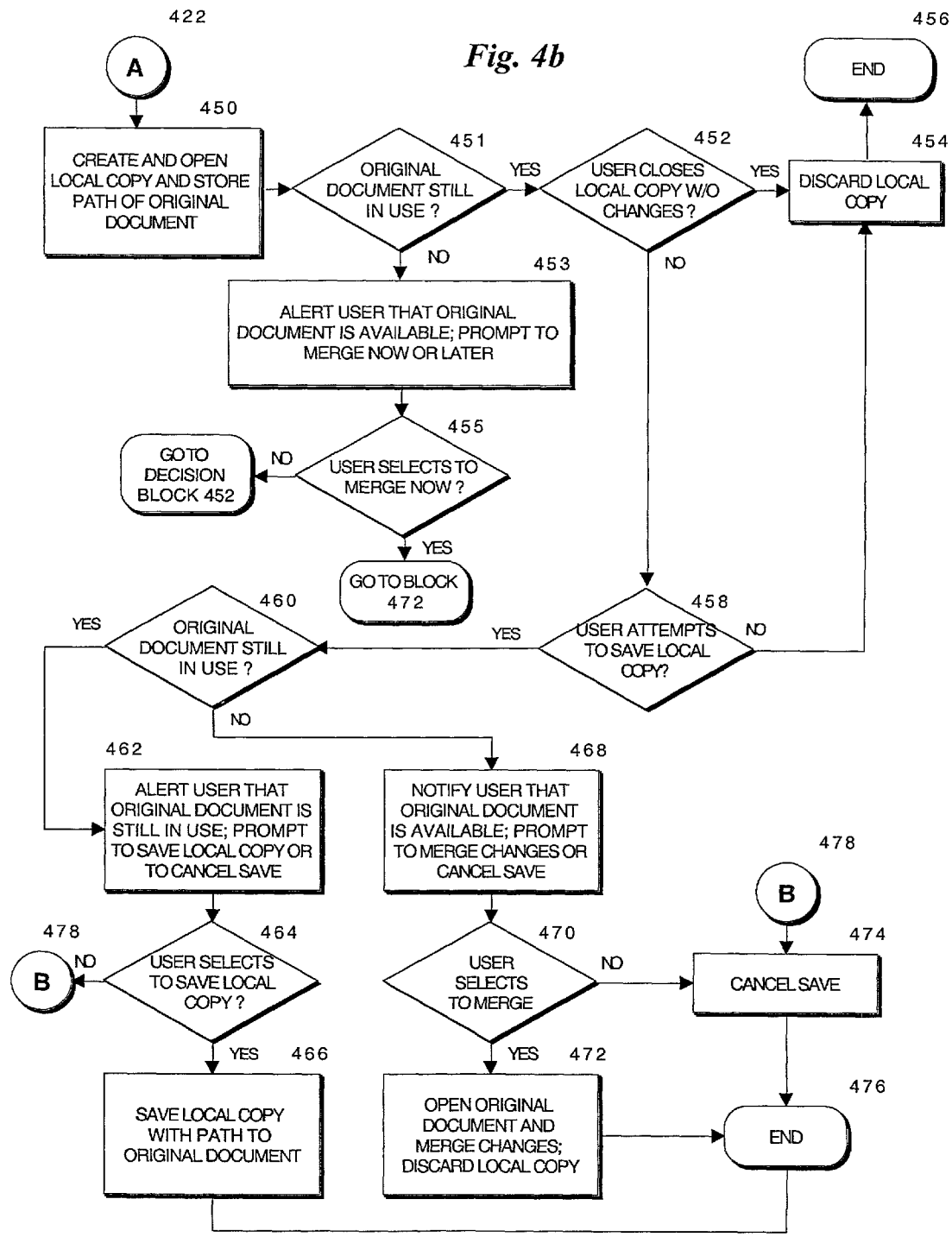

Turning now to FIGS. 4a and 4b, a flowchart is depicted which describes a method that is an exemplary embodiment of the present invention. In short, the method provides a means for enabling simultaneous multi-user document editing in a simple and effective manner that eliminates the need for sophisticated file servers (as depicted in FIG. 2b) or new file formats.

The method starts at step 400 and proceeds to step 402. At step 402, a user attempts to open an original document. The method then proceeds to decision block 404 in which a determination is made as to whether the original document is in use by another user. If the original document is not in use by another user, then the method branches to step 416 and the original document is simply opened. Because there is no potential for conflict among simultaneous editors in this case, the method proceeds to step 414 and ends.

Returning now to decision block 404 if a determination is made that the original document is in use by another user, the method branches to step 406. At step 406, the user is alerted that the original document is currently opened for editing by another user. The method then proceeds to step 408 and the user is prompted to select between three choices. The user may open a copy of the original document as a read-only copy. The user may also create a local copy for making modifications that may be subsequently merged with the original document. Finally, the user may elect to be notified when the original document becomes available. The method then proceeds to decision block 410 in which a determination is made as to whether the user selects to open a read-only copy of the original document. If the user selects this option, then the method branches to step 412. At step 412, a read-only copy is opened and the save command is disabled. The save command is disabled only to the extent that the read-only copy cannot be saved at the same path (i.e., location on the file server) as the original document. The method then branches to step 414 and ends.

Returning now to decision block 410, if the user has not selected to open a read-only copy, then the method branches to decision block 418 and a determination is made as to whether the user has selected to be notified when the original document becomes available. If the user has selected to be so notified, then the method proceeds to step 420 and the original documents status is monitored and the user is notified when the original document is no longer being used. When so notified, the user may obtain access to the document and make modifications to the original document. The method then proceeds to step 414 and ends.

Returning now to decision block 418, if the user has not selected to be notified of the original document's availability, then the user must have selected to create a local copy for subsequent merge. Accordingly the method branches to step 450 (FIG. 4b) via connector A 422.

At step 450, a local copy is created and opened and the path of the original document is stored in association with the local copy. The path of the original document may be stored in RAM, in non-volatile memory (e.g., a hard drive), in a system registry, or by any other conventional means of storing data. The method then proceeds to decision block 451 in which a determination is made as to whether the original document is still in use. If the original document is still in use then the method branches to step 452. In decision block 452 a determination is made as to whether the user closes the local copy without making changes. If the user closes the local copy without making changes, then no subsequent merge is necessary and the method branches to step 454. At step 454 a local copy is discarded. The method then proceeds to step 456 and ends.

If the determination in decision block 451 is that the original document is no longer in use, then the method branches to step 453. At step 453 the user is alerted that the original document is available and the user is prompted to choose whether to merge the changes made to the local copy into the original document now or later. From step 453 the method proceeds to step 455 where a determination is made as to whether the user selects merge the changes now. If the user selects merge the changes now, then the method branches to step 472. Otherwise, if the user selects merge the changes later, then the method returns to step 452.

The method utilizes a background process that periodically determines whether the original document is available. This determination is performed independent of any action initiated by the user. This background process is illustrated by steps 451, 453 and 455. Although these steps are placed at a particular location in the flow chart of FIG. 4b, those skilled in the art will appreciate that the background process is running continuously and that steps 451, 453 and 455 are merely exemplary steps illustrating the background process.

Returning now to decision block 452, if the user has not selected to close the local copy without changes, then the method branches to decision block 458 in which a determination is made as to whether the user attempts to save the local copy. If the user does not attempt to save the local copy then the method branches to step 454 and the local copy is discarded. The method then branches to step 456 and ends.

If, on the other hand, at decision block 458 the user attempts to save the local copy, the method branches to decision block 460 wherein a determination is made as to whether the original document is still in use. If the original document is still in use, the method branches to step 462 and the user is alerted that the original document is still in use. The user is also prompted to select between saving the local copy as a local copy (i.e., with no effect on the original document) or to simply cancel the user's save command. The method then proceeds to decision block 464 wherein a determination is made as to whether the user selects to save the local copy. If the user selects to save the local copy then the method branches to step 466. At step 466, the local copy is saved in association with the path to the original document. The path to the original document is stored so that the user can perform a merge of the local copy with the original document at a later time. The method then proceeds to 476 and ends.

Returning now to decision block 464, if a determination is made that the user does not select to save a local copy, then the method branches to step 474 through connectors 478. At step 474, the save command is cancelled. The method then branches to step 476 and ends.

Returning now to decision block 460, if a determination is made that the original document is no longer in use, the method branches to step 468 and the user is notified that the original document is available. The user is also prompted to choose whether to merge the changes made to the local copy into the original document or to cancel the user's save command. The method then branches to decision block 470 in which a determination is made as to whether the user selects to merge its changes into the original document. If the user does not select to merge the changes, the method branches to step 474 and the save command is cancelled. The method then proceeds to 476 and ends.

If, on the other hand, a determination is made at decision block 470 that the user desires to merge the changes into the original document, the method branches to step 472. At step 472 the original document is opened and the changes are merged into the original document. The local copy can then be discarded and the user will have full access to the original document. The method then branches to step 476 and ends.

An Exemplary Method for Emailing Changes to Another User

Figure 5:
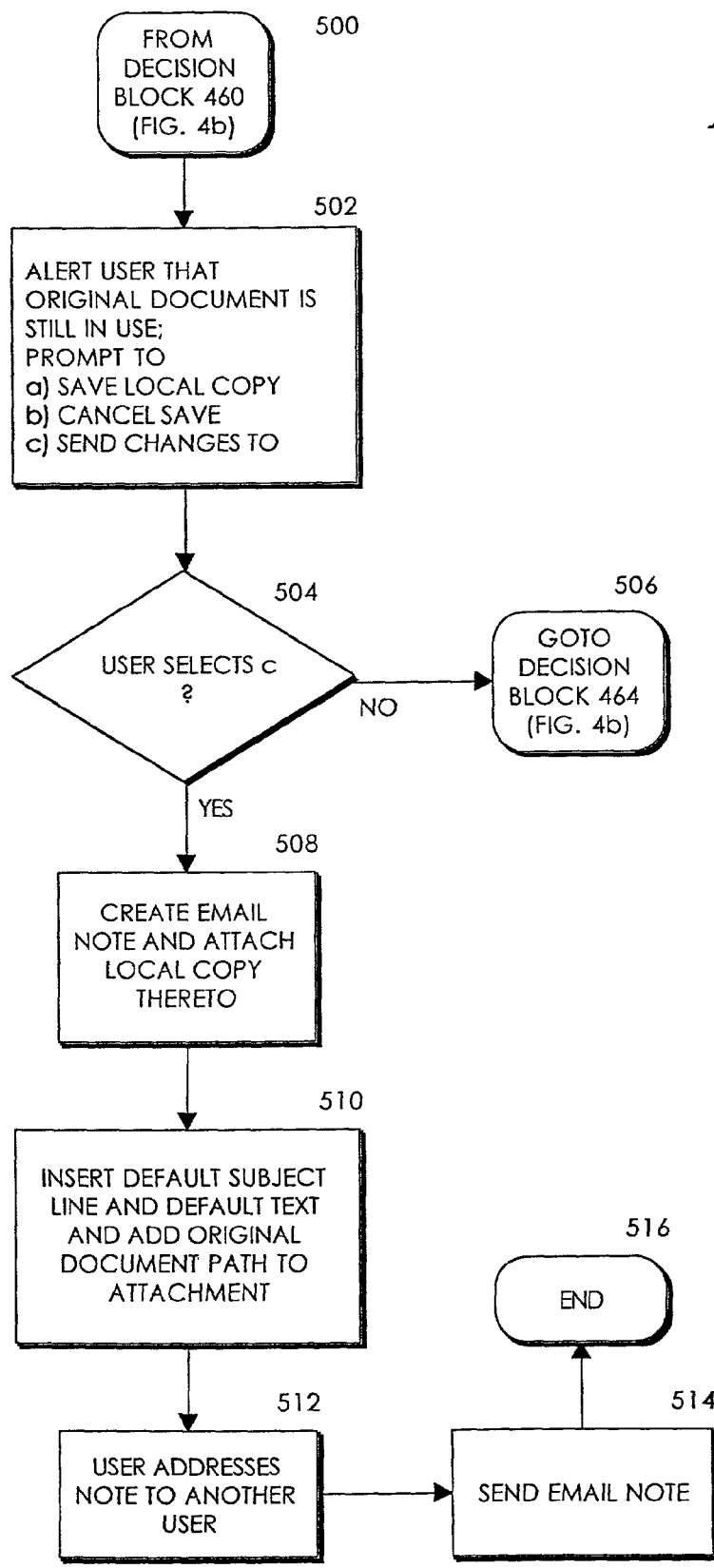
FIG. 5 is a flowchart depicting a method for enabling the subsequent merging of changes made by a user in an exemplary embodiment of the present invention.

FIG. 5 depicts an alternate embodiment of the method of FIGS. 4a and 4b. The alternate embodiment provides a means for emailing modifications made to an original document when the original document is in use by another user.

The method begins at step 500 where the alternate method branches from the "yes" branch from decision block 460 in FIG. 4b. That is, the determination has been made that the original document is still in use.

The alternate method proceeds from step 500 to step 502. In step 502, the user is alerted that the original document is still in use and is provided with three choices. As described in connection with step 462 (FIG. 4b), the user can select to save a local copy or cancel the save. However the alternate method provides the third choice of sending the changes to another user via email.

The method proceeds to step 504 and a determination is made as to whether the user has selected to send the changes to another user via email. If the user has not selected to send the changes to another user via email, the method branches to step 506 and the method of FIGS. 4a and 4b continue starting at decision block 464. If, on the other hand, the user selects to send the changes to another via email, the method branches to step 508.

At step 508, an email note is created and the local copy is attached in the conventional way as an attachment to the email note. The method then proceeds to step 510. At step 510, a default subject line can be inserted into the email note. For example, a default subject line such as "please merge file name" can be placed in the subject field of the email note. Additionally, at step 510 default text can be inserted into the message body of the email note. For example, a default message text of "can you merge these changes into file name" can be added into the message body of the email note. Finally, at step 510, the original document path that was stored in step 450 (FIG. 4b) can be added to the attachment so that the document editor can prompt the email recipient to merge the changes into the original document located at the attached path. This prompt-on-open functionality is described in more detail in FIG. 6.

The method then proceeds from step 510 to 512 and the user can address the email note to another user. The method branches to step 514 and the email note is sent to the addressed user. The method proceeds to step 516 and ends.

An Exemplary Method for Prompting a User to Merge Changes into an Original Document As mentioned above in connection with FIG. 5, FIG. 6 depicts an exemplary method for prompting a user to merge changes into an original document upon opening a local copy having a stored path to the original document. The method begins at step 600 and proceeds to step 602. At step 602, the user attempts to open a local copy. Of course, this could be any document opened within a document editor. The method then proceeds to decision block 604 wherein a determination is made as to whether a stored path flag has been set for the local copy. If a stored path flag has been set, then the local copy includes changes that are associated with an original document which is identified by a stored path. If the stored path flag is not set for a document, then the document is not associated with an original document and the method branches to step 624. At step 624, the document is opened in the conventional manner and the method proceeds to step 614 and ends.

If, on the other hand, a determination is made at decision block 604 that the stored path flag is set, the method branches to 606. At step 606, the stored original document path is retrieved and the method proceeds to decision block 608. At decision block 608, a determination is made as to whether the original document is being used by another user. If the original document is being used by another user then the method branches to step 610 and the user is notified that the original document is being used by another user. In this case, the method proceeds to step 620 and the local copy is opened, but no merging is done. The method then proceeds to step 622 and ends.

Returning to decision block 608, if the original document is not in use by another user then the method branches to step 612 and prompts the user for authorization to merge local copy with the original document. The method then proceeds to decision block 618 and a determination is made as to whether the user has authorized a merge. If the user has authorized a merge, the method branches to step 616 and the changes are merged into the original document. The location of the original document is, of course, identified by the path that was stored in association with the local copy. The method then branches to step 614 and ends.

Returning now to decision block 618, if the user does not authorize merging the changes into the original document, the method branches to step 620 and the local copy is simply opened. The method then branches to step 622 and ends.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

We claim:

1. A method for enabling simultaneous multi-user editing of an original document, the method comprising the steps of:
   receiving a request from a first user to open the original document;
   determining whether the original document is open at a second user, wherein the second user has exclusive rights to save the original document while the original document is open at the second user;
   in response to a determination that the original document is open at the second user, creating a local copy and storing a path of the original document with the local copy;
   in response to the receipt of a request to save changes to the local copy, determining whether the original document is still open at the second user;
   in response to a determination that the original document is not still open at the second user, identifying a location for the original document using the stored path and merging the local copy with the original document;
   in response to a determination that the original document is still open at the second user, prompting the first user to decide between saving the local copy with the path of the original document such that a subsequent merge of the saved local copy and the original document can be performed, and saving the local copy as a separate file as compared to the original document.

2. The method of claim 1, wherein the determination of whether the original document is open at a second user is made by determining whether an in-use flag is set for the original document.

3. The method of claim 1, further comprising the step of in response to a determination that the original document is still open at the second user, creating an email note with the local copy as an attachment and sending the email note to the second user for the subsequent merge.

4. The method of claim 1, further comprising the step of in response to a determination that the original document is still open at the second user, saving the local copy with the path of the original document, such that the second user attempting to open the saved local copy will be prompted to merge the saved local copy with the original document.

5. A computer-readable medium having computer-executable instructions for performing steps comprising:
   receiving a request from a first user to open the original document;
   in response to a determination that the original document is open at a second user, creating and storing a local copy and storing a path of the original document with the local copy;
   monitoring the original document by periodically determining whether the original document is still open at the second user, wherein the second user has exclusive rights to save the original document while the original document is open at the second user;
   in response to a determination that the original document is no longer open at the second user, notifying the first user that the original document is no longer open and prompting the user to decide whether to merge changes made to the local copy into the original document; and
   in response to input from the first user, merging changes made to the local copy into the original document, the location of the original document being identified by the stored path.

6. The computer-readable medium of claim 5, further comprising the step of storing the path of the original document as a property of the local copy.

7. The computer-readable medium of claim 5, further comprising the step of storing the path of the original document as a registry key associated with the local copy.

8. The computer-readable medium of claim 5, further comprising the step of in response to an attempt to open the stored local copy and to a determination that the original document is no longer open at the second user, providing a prompt to merge the local copy with the original document.

9. The computer-readable medium of claim 5, further comprising the step of creating an email note with the local copy as an attachment and sending the email note to the second user prior to the merging changes step.

10. The computer-readable medium of claim 9, further comprising the step of attaching the path of the original document to the email note.

11. The computer-readable medium of claim 10, wherein the step of creating an email note comprises inserting a default entry into a subject field of the email note.

12. The computer-readable medium of claim 10, wherein the step of creating an email note comprises inserting a default entry into a message body field of the email note.

13. A system for enabling simultaneous multi-user editing of an original document, comprising:
   a file server operative to maintain an original document at a document location;
   a first local document editor of a first user operative to make changes to the original document and to set a flag on the original document, the flag indicating that the original document is open at the first user, wherein the first user has exclusive rights to save the original document while the original document is open at the first user;
   a second local document editor of a second user operative to request access to the original document from the file server and determine whether the flag is set; and
   wherein, in response to a determination that the flag is set, the second local document editor is further operative to create a local copy of the original document and to store the document location with the local copy as a registry key associated with the local copy so that a change to the local copy can be merged with the original document at a later time.

14. The system of claim 13, wherein the document location is stored with the local copy as a property of the local copy.

15. The system of claim 13, wherein the second local document editor is further operative to monitor in a background process whether the original document is still open at the first user and, if the original document becomes available, to provide a prompt to merge the local copy with the original document.

16. The system of claim 13, wherein the second local document editor is further operative to cause the creation of an email note with the stored local copy as an attachment and to cause the email note to be sent to the first user.

17. The system of claim 13, wherein the second local document editor is further operative to cause the attachment the path of the original document to the email note.

18. The system of claim 13, wherein the second local document editor is further operative to cause the insertion of a default entry into a subject field of the email note.

19. The system of claim 13, wherein the second local document editor is further operative to cause the insertion of a default entry into a message body field of the email note.

20. A method for enabling simultaneous multi-user editing of an original document file without reference to a multi-user control file, the method comprising:
 receiving a request from a first user to open the original document file;
 determining whether the original document file is open at a second user, wherein the second user has exclusive rights to save the original document while the original document is open at the second user;
 in response to a determination that the original document is open at the second user, creating a local document file and storing a path of the original document file as part of the local document file;
 in response to the receipt of a request to save changes to the local document file, determining whether the original document file is still open at the second user;
 in response to a determination that the original document file is not still open at the second user, identifying a location for the original document using the stored path and merging the local document file with the original document file;
 in response to a determination that the original document file is still open at the second user, saving the local document file with the path of the original document file as a registry key associated with the local copy;
 in response to a request from a user to open the saved local document file, prompting the user to merge the saved local document file and the original document file;
 wherein the original document file is progressively updated with merged edits so that edits to the original data file may be accessed by subsequent editors.

21. The method of claim 20 further comprising:
 monitoring the original document file; and
 in response to a determination that the original document file is no longer open at the second user, notifying the first user that the original document file is no longer open.

22. The method of claim 21 wherein, if the local document file and original document file are merged, the first user is allowed to work in the original document file after the merger of the local document file and original document file.

23. The method of claim 20, wherein the determination of whether the original document file is open at a second user is made by determining whether an in-use flag is set for the original document file.

24. The method of claim 20, further comprising:
 in response to a determination that the original document file is still open at the second user, creating an email note with the local document file as an attachment and sending the email note to another user for a subsequent merge.

25. The method of claim 24, further comprising attaching the path of the original document file to the email note.

26. The method of claim 24, wherein creating an email note comprises inserting a default entry into a subject field of the email note.

27. The method of claim 26, wherein creating an email note comprises inserting a default entry into a message body field of the email note.

* * * * *